US012682932B2

(12) United States Patent
Grant et al.

(10) Patent No.: US 12,682,932 B2
(45) Date of Patent: Jul. 14, 2026

(54) SYSTEMS AND METHODS FOR AUTOMATICALLY GENERATING A VIDEO PRODUCTION

(71) Applicant: Canva Pty Ltd, Surry Hills (AU)

(72) Inventors: Jackson Grant, Brisbane (AU); Bhautik Jitendra Joshi, Sydney (AU); Cheng Chen, Melbourne (AU); Aditya Sangram Singh Rana, Vienna (AT); Emilio Tylson Baixauli, Vienna (AT)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/652,942

(22) Filed: May 2, 2024

(65) Prior Publication Data

US 2024/0371407 A1     Nov. 7, 2024

(30) Foreign Application Priority Data

May 4, 2023     (AU) ................................. 2023202796

(51) Int. Cl.
*G11B 27/031*          (2006.01)
(52) U.S. Cl.
CPC ................................. *G11B 27/031* (2013.01)
(58) Field of Classification Search
CPC ...................................................... G11B 27/031
See application file for complete search history.

(56) References Cited

U.S. PATENT DOCUMENTS

| | | | |
|---|---|---|---|
| 12,026,199 B1 * | 7/2024 | Siagian ................. | G06F 16/685 |
| 2010/0050083 A1 * | 2/2010 | Axen ..................... | G11B 27/32 |
| | | | 345/426 |
| 2011/0249953 A1 * | 10/2011 | Suri ..................... | H04N 9/8205 |
| | | | 386/239 |
| 2020/0090246 A1 * | 3/2020 | Goyal ................... | G06F 16/748 |
| 2020/0311120 A1 * | 10/2020 | Zhao ..................... | G06F 18/23 |
| 2023/0259779 A1 * | 8/2023 | Ye ......................... | G06F 16/783 |
| 2024/0126576 A1 * | 4/2024 | Bent, III ................ | G06F 9/453 |

OTHER PUBLICATIONS

Extended European Search Report for European application No. 24173774.1 mailed Oct. 2, 2024, pp. 1-8.
(Continued)

*Primary Examiner* — Gelek W Topgyal
(74) *Attorney, Agent, or Firm* — GrowIP Law Group LLC

(57)          ABSTRACT

Described herein is a computer implemented method for automatically generating a video production. The method includes determining a production description and a set of media items. A media item description corresponding to each media item is generated, and a prompt based on the production description and the media item descriptions is generated. The method further includes generating, using the prompt, cohesion information that includes a caption corresponding to each media item and automatically generating the video production based on the set of media items and the cohesion information. The video production is generated to include a set of one more scenes; each scene corresponds to a particular media item; and each scene is generated so the caption corresponding to the particular media item that the scene corresponds to is displayed during playback of the scene.

17 Claims, 4 Drawing Sheets

(56) References Cited

OTHER PUBLICATIONS

Jun Chen et al: "Video ChatCaptioner: Towards the Enriched Spatiotemporal Descriptions," arxiv.org, Cornell University Library, 201 Olin Library Cornell University Ithaca, NY 14853, Apr. 9, 2023, XP091480454, pp. 1-12.

Udhayanan Prateksha et al: "Recipe2Video: Synthesizing Personalized Videos from Recipe Texts," 2023 IEEE/CVF Winter Conference on Applications of Computer Vision (WACV), IEEE, Jan. 2, 2023 (Jan. 2, 2023), pp. 2267-2276, XP034290669, DOI: 10.1109/WACV56688.2023.00230 [retrieved on Feb. 6, 2023].

BLIP-2: Bootstrapping Language-Image Pre-training with Frozen Image Encoders and Large Language Models, Junnan Li, et al., arXiv:2301.12597v2 [cs.CV], May 1, 2023, pp. 1-13.

CoCa: Contrastive Captioners are Image-Text Foundation Models, Jiahui Yu, et al., arXiv:2205.01917v2 [cs.CV], Jun. 14, 2022, pp. 1-19.

* cited by examiner

300

302 Display input UI

304 Determine production description

306 Determine media item(s)

308 Generate media item description(s)

310 Generate prompt

312 Generate cohesion information

314 Generate production

316 Output production

400

500

SYSTEMS AND METHODS FOR AUTOMATICALLY GENERATING A VIDEO PRODUCTION

CROSS-REFERENCE TO RELATED APPLICATION

This application is a U.S. Non-Provisional Application that claims priority to Australian Patent Application No. 2023202796, filed May 4, 2023, which is hereby incorporated by reference in its entirety.

TECHNICAL FIELD

Aspects of the present disclosure are directed to systems and methods for automatically generating a video production.

BACKGROUND

Equipment for capturing digital media such as photographs and videos is incredibly widespread. For example, most, (if not all, smart phone devices) allow such media to be captured.

Once media has been captured users often want to produce a video from it—for example by combining multiple media items into a cohesive production. Users may wish to do this for a variety of reasons—e.g. to share directly with friends and family or to post on a social media site for the user's followers to view.

While video production tools/applications have progressed, producing a video can still be a time consuming and at times complex operation.

SUMMARY

Described herein is a computer implemented method for automatically generating a video production, the method including: determining a production description, the production description including text that generally describes the video production that is to be generated; determining a set of media items, the set of media items including one or more media items that are to be included in the video production that is to be generated; generating, by a computer processing unit, a set of media item descriptions, the set of media item descriptions including a media item description corresponding to each media item; generating a prompt based on the production description and the set of media item descriptions; generating, using the prompt, cohesion information, the cohesion information including a set of captions, the set of captions including a caption corresponding to each media item; and automatically generating the video production based on the set of media items and the cohesion information, wherein: the video production is generated to include a set of one more scenes; each scene corresponds to a particular media item; and each scene is generated so the caption corresponding to the particular media item that the scene corresponds to is displayed during playback of the scene.

Figure 1:
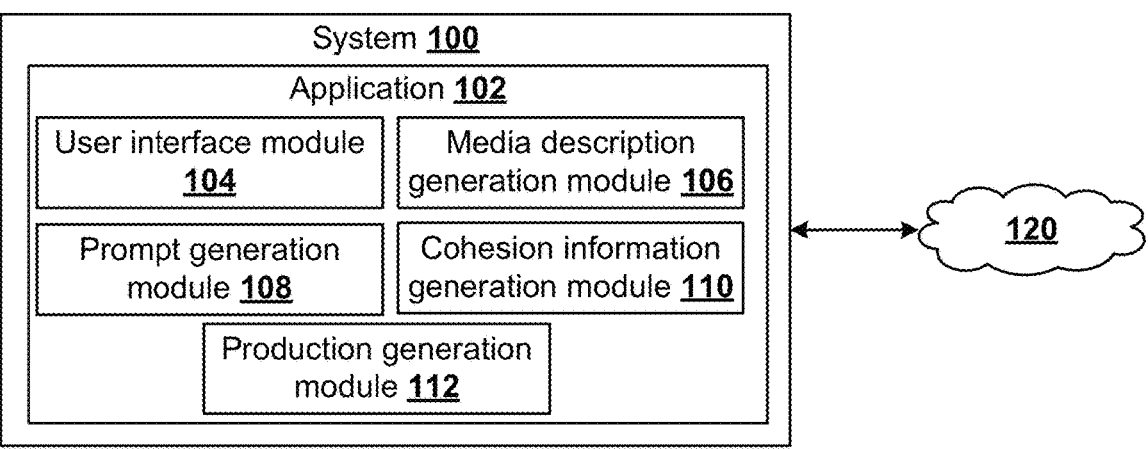
FIG. 1 is a diagram depicting a system for performing various features of the present disclosure.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed above, many scenarios arise in which a user may wish to create a video production. At a general level, creating a short video production for a social media platform such as TikTok or Instagram typically involves a user selecting media items that will make up the scenes of the production (e.g. videos and/or images), ordering the media items (or scenes), creating text overlays (referred to herein as captions) for the scenes so the production is a cohesive whole and adding each caption to the relevant scene.

The present disclosure is directed to systems and methods for automatically generating a video production based on a production description and a set of media items.

The techniques disclosed herein are computer implemented techniques that are performed by one or more computer processing systems. FIG. 1 depicts an example computer processing system 100. System 100 may be any suitable type of computer processing system, for example a desktop computer, a laptop computer, a tablet device, a smart phone device, a server computer, or an alternative computer processing system. System 100 may, for example, have an architecture that is the same as (or similar to) system 200 described below.

In the present example, computer system 100 is configured to perform the functions described herein by execution of a software application (or a set of software applications) 102—that is, computer readable instructions that are stored in a storage device (such as non-transitory memory 210 described below) and executed by a processing unit of the system 100 (such as processing unit 202 described below).

In the present example, application 102 includes a number of modules which interoperate to automatically generate a video production. These modules are discussed below and include: a user interface module 104; a media description generation module 106; a prompt generation module 108; a cohesion information generation module 110; and a production generation module 112.

In the present example, system 100 is connected to a communications network 120. Via network 120, system 100 can communicate with (e.g. send data to and receive data from) other computer processing systems (not shown).

Figure 2:
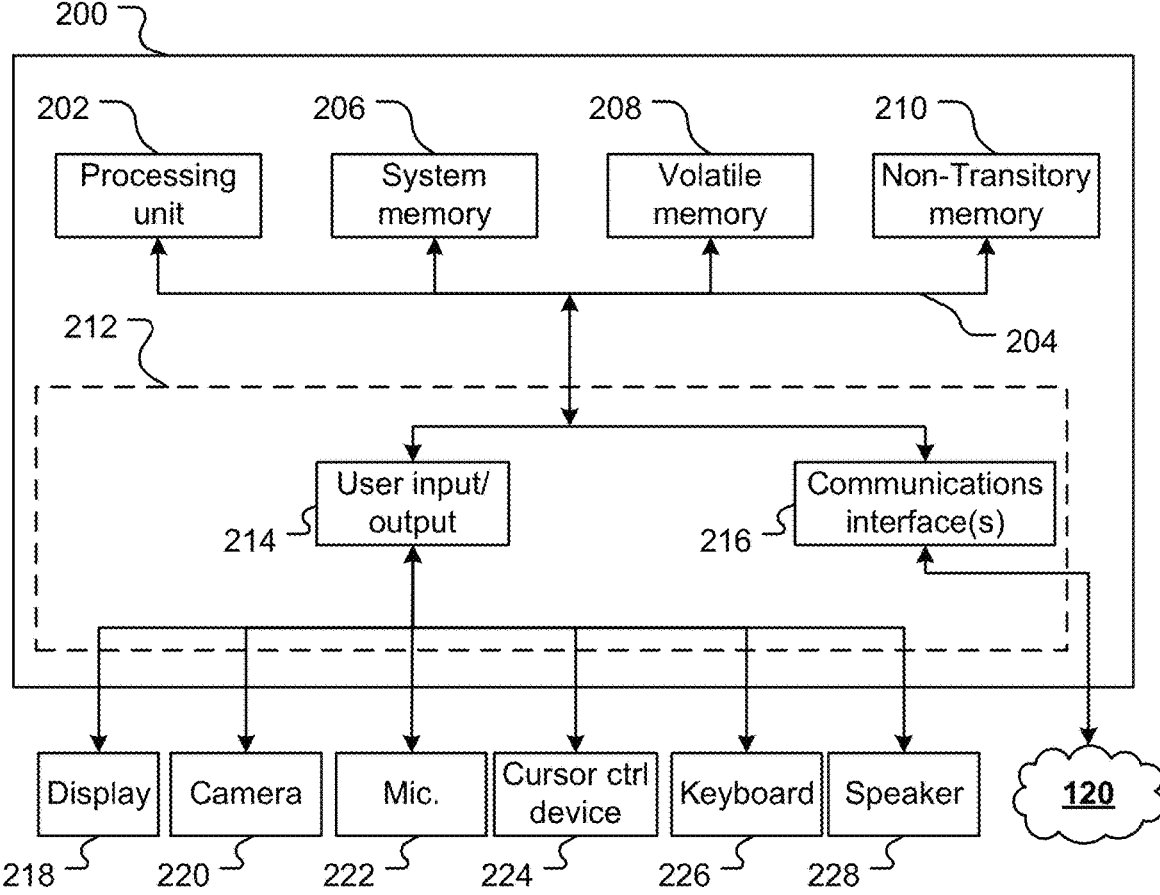
FIG. 2 is a block diagram of an example computer processing system.

Turning to FIG. 2, a block diagram of a computer processing system 200 configurable to implement embodiments and/or features described herein. For example, system 100 of FIG. 1 may be a computer processing such as that show in FIG. 2 (though alternative architectures are possible).

System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable (either in a shared or dedicated manner) by system 200.

Through a communications bus 204 the processing unit 202 is in data communication with a one or more machine readable storage (memory) devices which store computer readable instructions and/or data which are executed by the processing unit 202 to control operation of the processing system 200. In this example, system 200 includes a system memory 206 (e.g. a BIOS), volatile memory 208 (e.g. random access memory such as one or more DRAM modules), and non-transitory memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, the connection between the device and system 200 may be via wired or wireless hardware and communication protocols, and may be a direct or an indirect (e.g. networked) connection.

Generally speaking, and depending on the particular system in question, devices to which system 200 connects include one or more input devices to allow data to be input into/received by system 200 and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may, for example, include a keyboard, a pointing device (such as a mouse or trackpad), a touch screen, and/or other input devices. System 200 may also include or connect to one or more output devices controlled by system 200 to output information. Such output devices may, for example, include one or more display devices (e.g. a LCD, LED, touch screen, or other display devices) and/or other output devices. System 200 may also include or connect to devices which act as both input and output devices, for example touch screen displays (which can receive touch signals/input and display/output data) and memory devices (from which data can be read and to which data can be written).

By way of example, where system 200 is an end user device such as (such as system 100), it may include a display 218 (which may be a touch screen display), a camera device 220, a microphone device 222 (which may be integrated with the camera device), a cursor control device 224 (e.g. a mouse, trackpad, or other cursor control device), a keyboard 226, and a speaker device 228.

System 200 also includes one or more communications interfaces 216 for communication with a network, such as network 120 of FIG. 1. Via the communications interface(s) 216, system 200 can communicate data to and receive data from networked systems and/or devices.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (which may also referred to as computer software or computer programs). Generally speaking, such applications include computer readable instructions and data which, when executed by processing unit 202, configure system 200 to receive, process, and output data. Instructions and data can be stored on non-transitory machine readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications which, when executed by the processing unit 202, configure system 200 to perform various computer-implemented processing operations described herein. For example, and referring to FIG. 1 above, system 100 includes (and executes) application 102.

In some cases part or all of a given computer-implemented method will be performed by system 200 itself, while in other cases processing may be performed by other devices in data communication with system 200.

Figure 3:
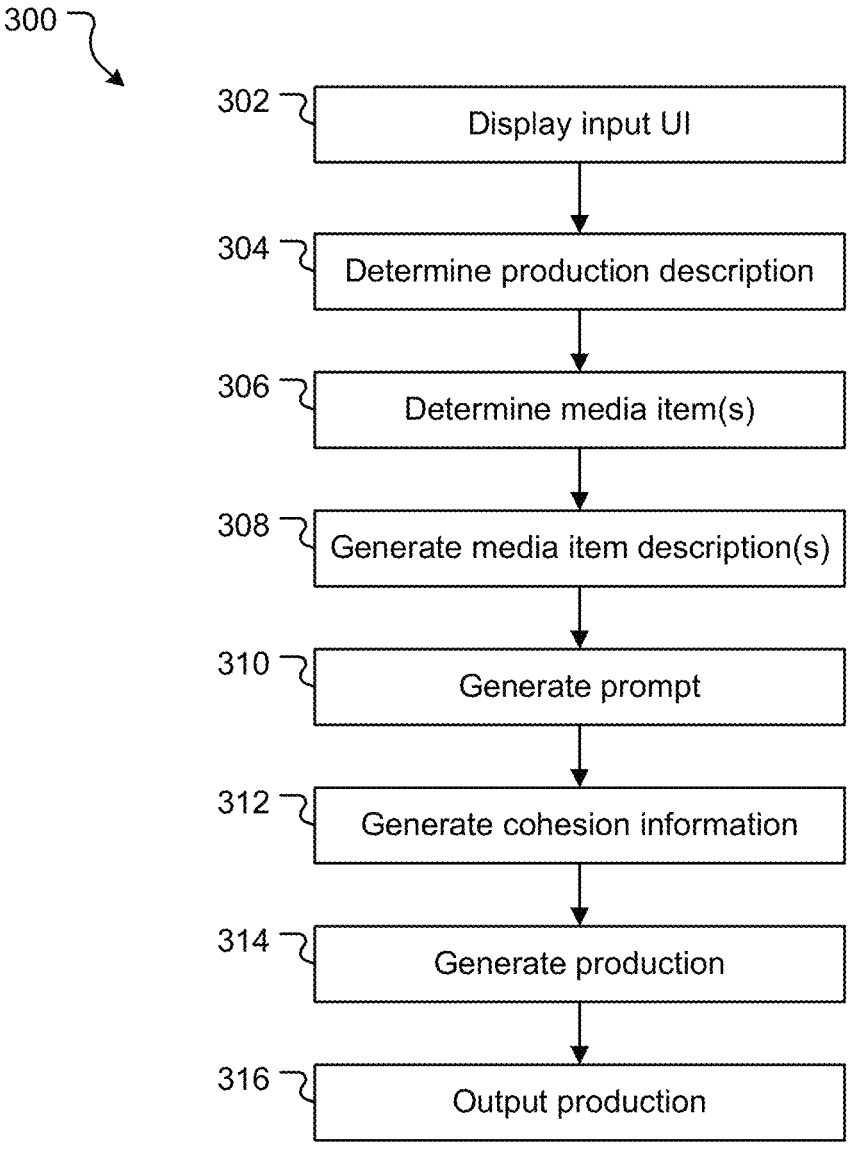
FIG. 3 is a flowchart depicting operations performed to automatically generate a video production.

Turning to FIG. 3, a method 300 for automatically generating a video will be described.

The operations of method 300 will be described as being performed by application 102 (and the various associated modules) running on system 100. The operations could, however, be performed by one or more alternative applications running on system 100 and/or one or more alternative computer processing systems.

Application 102 may be configured to perform method 300 in response to detecting various trigger events. As one example, application 102 may (e.g. via user interface module 104) display user interface (not shown) that includes a "generate video production" control or the like. Application 102 may then perform method 300 in response to detecting activation of such a control.

At 302, application 102 displays an input user interface (UI), e.g. on display 218. Application 102 may display the input UI using the user interface module 104. Generally speaking the input UI provides a mechanism for a user to define or select a production description and select one or more media items to be used on the production that will be generated.

Various input UI's are possible. One example is graphical user interface (GUI) 400 depicted in FIG. 4 which will be described alongside operations 304 and 306 below.

At 304, application 102 determines a production description. Generally speaking, the production description provides a textual description of the general theme or purpose of the production. For example, the production description may be a text string such as "a promotional video for a diving school" or "a business presentation for my new razor product" or "the different dogs that come to my doggy daycare" or "my recent trip to Paris" (or any other production description).

Application 102 may determine the production description in various ways. In the present embodiments, application 102 determines the production description based on text input entered by a user via a text input control. One example of such a text input control is control 402 of UI 400.

In certain embodiments, application 102 is configured to process the production description to ensure it complies with a set of production description rules. Various rules may be enforced. As one example, a rule may require the production description to be less than or equal to a defined number of characters (e.g. <=100 characters, <=150 characters, or an alternative character limit). As another example, a rule may require that the production description does not include any words from a set of blacklisted words (e.g. any words that are considered to indicate that a user is trying to generate a potentially offensive or otherwise undesirable production). If one or more rules are not complied with, application 102 may display a prompt asking the user to amend or enter a new production description.

In addition (or as an alternative) to a text entry input, application 102 may provide a UI mechanism for a user to select a production description from a set of predefined production descriptions. For example, application 102 may provide a drop-down list of options such as: "create a TikTok video for my friends", "create a TikTok video for my business", "create an Instagram post of my pet".

As yet a further example, application 102 may (in addition or by way of alternative) provide a user with various selectable options that are then used to create the production description. For example, application 102 may provide options such as: a platform option, which allows a user to select a platform that the video is to be posted on (e.g. TikTok, Instagram, YouTube, Vimeo, or an alternative platform) or enter text describing a platform; a tone option which allows a user to select a tone for the video (e.g. fun, comedy, serious, business, scary, or any other mood) or enter text describing a mood; a subject option which allows a user to select a subject for the video (e.g. vacation, business trip, meal, product promotion, pet, other subject) or enter text describing a general subject; a form option, which allows a user to select a form for the video (e.g. a story, a presentation, a slideshow, or an alternative form). From selected or entered options, application 102 then generates a production description (which application 102 may display in a text input control such as 402 for the user to edit further, reject, or accept).

At 306, application 102 determines a set of media items. The set of media items may include one or more image media items (e.g. in an image format such as bmp, png, jpeg, gif, or an alternative image format) and/or one or more video media items (e.g. in a video format such as mpeg4, mov, wmv, avi, or an alternative video format).

In the present embodiments, application 102 determines the media item(s) based on one or more media selection user inputs that select the media item(s).

Figure 4:
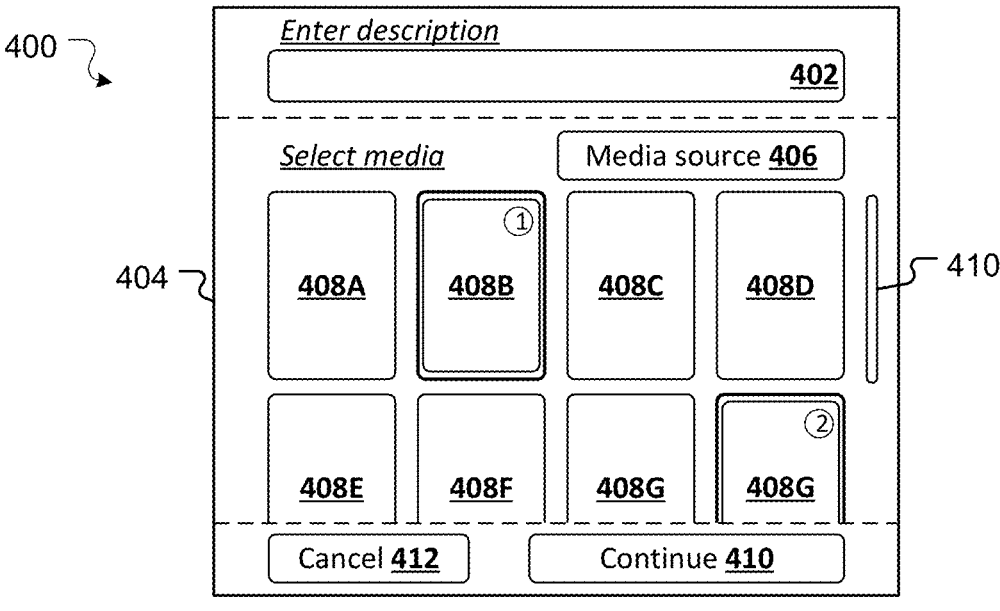
FIG. 4 depicts an example user interface.

By way of example, UI 400 of FIG. 4 includes a media item selection region 404 which can be used by a user to select media items. Region 404 of the present example includes a media source selection control 406. On detecting user input activating the media source selection control 406, application 102 may display a source selection UI (not shown) which allows a user to browse or search for media files. This may include, for example choosing a local folder to access media items that are stored on locally accessible memory such as 210 or choosing a remote folder that stores media items at a network-accessible location—e.g. a networked attached storage device, a cloud storage location, a server, or an alternative networked location. Application 102 may be configured to initially select a default media location.

Region 404 of the present example also includes thumbnail(s) 408 of media item(s) that are accessible at the selected (or default) media source. In this example, four thumbnails 408A-D are completely displayed, four thumbnails 408E-H are partially displayed, and a scroll control 410 is displayed (allowing a user to scroll through further thumbnails). A user may select a particular media item by interacting with that media item's thumbnail 408 (unless the media item is already selected, in which case such interaction may cause deselection of the media item). Such interaction may, for example, be contacting the thumbnail in question (where UI 400 is displayed on a touch screen display) and/or selecting the thumbnail using a cursor control device 224. In this example, thumbnails 408B and 408G (and the media items corresponding thereto) have been selected, which is indicated by the heavier weight border and a circular badge which indicates the selection order of the selected media items (in this case thumbnail 408B displayed with a (1) badge indicating it was the first (in order) selection, and thumbnail 408G displayed with a (2) badge indicating it was the second (in order) selection.

UI 400 also includes a cancel control 412 (activation of which cancels the production generation process and cause application 102 to cease displaying UI 400) and a continue control 410 (activation of which causes application 102 to proceed with the production generation based on the description entered via control 402 and media item(s) selected via region 404).

While GUI 400 has been provided as an example, alternatives input UI's are possible. As one example, the input UI may be a command line interface type UI that a user can use to provide the production description and media item identifiers (e.g. file locations or other identifiers) for media items that are to be used on the production generation. As a further example, application 102 may permit a user to upload a text (or other file) that includes the production description and media item identifiers (e.g. file locations or other identifiers).

At 308, application 102 processes the media item(s) determined at 306 to automatically generate a media item description corresponding to each media item. For example, if the set of media items includes a first media item, a second media item, and a third media item application 102 generates a media item description corresponding to each of those media items—e.g. a first media item description, a second media item description, and a third media item description.

In the present embodiments, each media item description that is generated is a text string that, generally speaking, provides a textual description of the image or video that the media item shows.

Application 102 may be configured the generate media item descriptions in various ways. One example method for generating a media item description corresponding to a media item is described below with reference to FIG. 6.

At 310, application 102 automatically generates a prompt. As described further below, the prompt is a text string that is used as input to a machine learning model (e.g. a large language model (LLM)) to generate what will be referred to as cohesion information. In the present embodiment, application 102 generates the prompt based on the production description (determined at 304), the media item description(s) (generated at 308), and prompt generation data.

Application 102 may be configured to generate a prompt in various ways. In the present embodiment, application 102 generates the prompt using the prompt generation module 108. The precise format of the prompt that is generated by application 102 (or module 108) and the text of the prompt will depend on a variety of factors. These include, for example, the machine learning model that the prompt is to be used with (e.g. a template prompt that is to be used to generate a prompt for use with OpenAI's ChatGPT may differ to a template prompt that is to be used to generate a prompt for Google's Bard) the manner in which that machine learning model has been trained, and the user inputs (and/or other data) that are available for use in generating the prompt.

In the present embodiment, application 102 generates a prompt by constructing a text string out of a plurality of component parts (e.g. by concatenating the component parts together). The component parts (and, where required, rules for constructing a prompt from those parts into) are defined by the prompt generation data.

The component parts include one or more set text components. The set text component(s) define set text that is not changed when generating the prompt.

The component parts also include one or more placeholder components. When generating the prompt, each placeholder component is replaced with replacement text that is generated based on one or more inputs (e.g. the production description, the media items, the media item descriptions, and/or other inputs).

By way of example, the prompt generation data may include placeholder components such as:

A context placeholder, which is populated with (or with text based on) the production description determined at 304.

A media item description(s) place holder, which is populated with each of the media item descriptions generated at 308.

A scene number placeholder, which is populated with the number of scenes that the production is to include (and in this example is equal to the number of media items determined at 306).

By way of example, the prompt generation data may include set text components such as:

An ordering component, which includes text that cues the machine learning model to determine an order of the media items.

An output format component, which includes text that cues the machine learning model on a particular output format desired.

A tone component, which includes text that cues the machine learning model to generate cohesion information that has a particular tone, character or quality (e.g. happy, fun, playful, serious, business, dark, scary, or any other tone/character/quality).

A form component, which includes text that cues the machine learning model to generate an output video having a particular form (e.g. a story, a presentation, a slide show, or another form).

As will be appreciated, alternative placeholder components and/or set text components may be used. As one example, while the example set text components above include a tone and a form component, one or both of these could be configured as placeholder components that are populated at the time. For example, application 102 may be configured to generate tone and/or form text based on the production description. For example, by processing a production description such as "a business presentation for my new widget" application 102 may determine: replacement text of "business" for a replaceable tone component; and replacement text of "presentation" for a replaceable form component. In this case application 102 may process the production description to determine/generate the relevant replacement text for a given placeholder component using various techniques, including parsing to identify relevant parts of speech, sentiment analysis, and/or other techniques.

In certain embodiments, application 102 may be configured to explicitly request that a user provide text for each placeholder component. This may be, for example, by asking a user to select a word or phrase from a predefined set of words/phrases (or enter text) for a given placeholder component. For example, and as described above, application 102 may provide a UI control that allows a user to select a "tone" for the presentation from a predefined set of tone options (or to enter text describing a tone that the user would like for the production).

By way of further example, the prompt generation data may be (or include) a pre-assembled template prompt—e.g. a string that includes the relevant set text components placeholder components. One example of such a template prompt is as follows:

"I will provide descriptions of [scene number placeholder] media files that you will use to create a video about [context placeholder]. The media file descriptions are: [media item descriptions, separated by commas]. Determine an order for the media files and suggest a caption for each file to generate a business presentation. Generate a set of key/value pairs that is ordered based on the order and in which each key/value pair has the format {"media file description": "caption"}.

In this example, the placeholder components are indicated in bold/italicized text. In addition, the set text component includes: an ordering component "determine an order for the media files"; a tone component "business"; a form component "presentation"; an output format component "Generate an ordered set of key/value pairs in which each key/value pair has the format {"media file description": "text overlay"}". In this example, additional set text components are used, such as: a preamble component "I will provide descriptions of"; a first joining component "media files that you will use to create a video about"; a second joining component "The media file descriptions are:" and so forth.

In some scenarios, application 102 may not be able to determine or generate replacement text for one or more of the placeholder components based on the user inputs. In this case application 102 may be configured to either omit a given placeholder when generating the prompt or use default replacement text for that placeholder. To illustrate this, consider an implementation in which a first placeholder is provided (e.g. a tone placeholder), but no replacement text for that placeholder can be determined or generated based on the user inputs. In this case application 102 may be configured to generate the prompt without any replacement text for the placeholder (e.g. without any tone text). By way of further illustration, consider an implementation in which a second placeholder is provided (e.g. a form placeholder), but no replacement text for that placeholder can be determined or generated based on the user inputs. In this case application 102 may be configured to generate the prompt using default text that has been defined for the second placeholder (e.g. "presentation", or "story", or any other appropriate default text for the placeholder in question).

Many alternative template prompts (and many alternative approaches to generating a prompt) are possible.

In the present example, application 102 generates the cohesion information to include a media item order. In alternative embodiments this need not be done. For example, application 102 may instead use the order in which media items are selected by a user as the final media item (and, therefore, scene) order (and may display a prompt—e.g. in UI 400 described above—that indicates to the user that they should select media items in the order they wish those media items to be shown in the production). If media item order is not being determined, the prompt an ordering component.

At 312, application 102 uses the prompt to automatically generate cohesion information. In the present embodiment, the cohesion information includes a set of captions and scene order information. The set of captions includes a caption (e.g. a text string) corresponding to each media item. The scene order information allows an order of the media items to be determined.

In the present embodiments, application 102 generates the cohesion information using the cohesion information generation module 110. In this embodiment, the cohesion information generation module 110 is (or makes use of) a large language machine learning model (LLM). Any appropriate LLM may be used. For example, application 102 (or cohesion information generation module 110) may be configured to interface with a third party LLM, such as OpenAI's ChatGPT4, Google's Bard, or an alternative service. Alternatively, application 102 (or cohesion information generation module 110) may itself run a machine learning model (e.g. a LLM or other machine learning model) that is trained to generate text (e.g. the cohesion information described above) from a prompt (such as that described).

In the present embodiments, the format of the cohesion information that is generated by the machine learning model is directed by the prompt itself (e.g. by the output format component of the prompt). In the particular example above, the output format component of the prompt directs the output to be (or include) a set of key value pairs, each key identifying a media item (via the media item description generated for that media item) and each value providing a caption for the corresponding media item.

At 314, application 102 automatically generates a new production (or data defining a new production). The new production is based on the media item(s) (determined at 306) and the cohesion information (generated at 312).

The precise manner in which a production is generated will depend on how application 102 (or another application that is to be used to view and/or edit the production) stores and/or displays productions. An example method for generating a new production is described below with reference to FIG. 7.

Generally speaking, however, the new production includes an ordered set of scenes. Each scene corresponds to a particular media item and is generated so that during playback of the scene the caption that was generated for the scene's particular media item is displayed. In the present example, application 102 generates each scene to include (or be associated with) a caption element that is displayed when the scene is played (e.g. a caption that is superimposed on the media item of the scene for the duration of the scene or for a set time within the scene).

Figure 5:
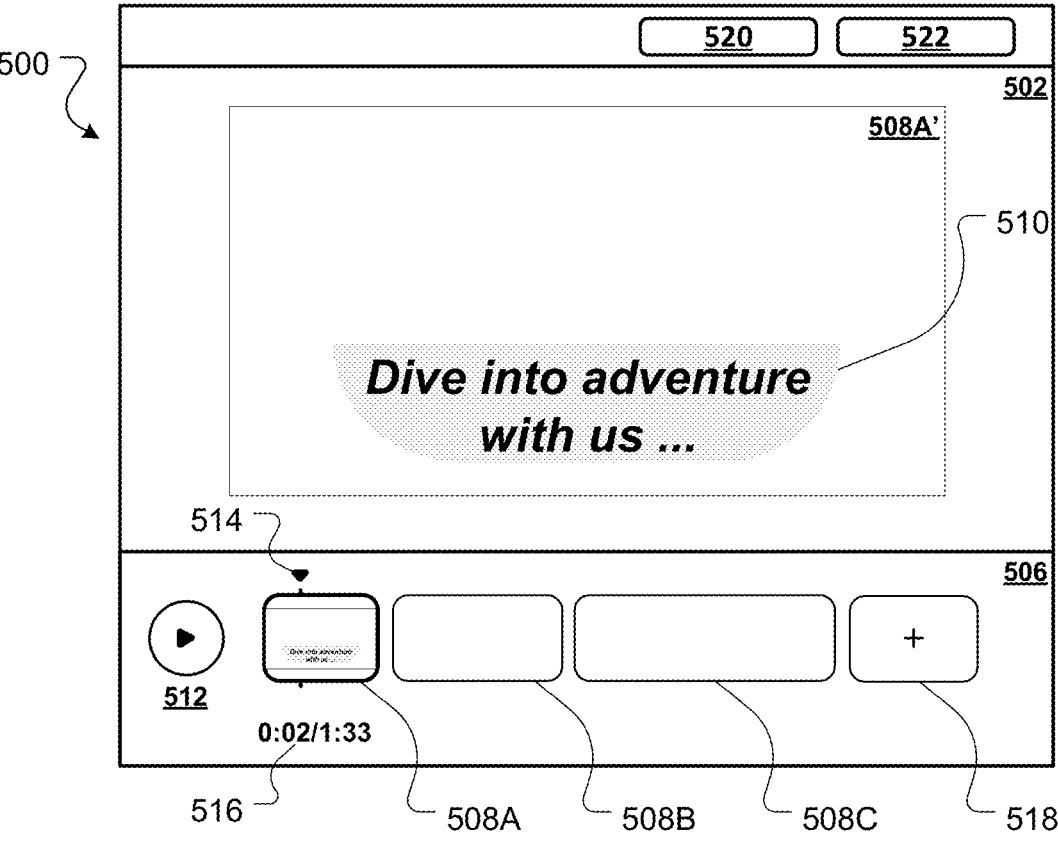
FIG. 5 depicts an example user interface.

At 316, application 102 outputs the production generated at 314. Application 102 may be configured to output the production in various ways. In the present embodiments, application 102 outputs the production in an editor UI that allows a user to view, edit, and/or perform other operations with respect to the production. One example of such a UI is UI 500 of FIG. 5.

UI 500 includes a display region 502 in which application 102 displays a production. In particular, the display region 502 may be used to view (and, in this example, edit) scenes of a production and/or play a production as a whole.

UI 500 also includes an overview region 506 which is used to display an overview (or partial overview) of the production that is being viewed. In particular, application 102 displays scene previews 508 that correspond to the scenes of the production being viewed in the overview region 506. In UI 500, the scene previews 508 are displayed sequentially along a horizontal axis in their scene order (as defined by the production data), thus providing a timeline view of the production.

A user can interact with a scene preview 508 (e.g. by contacting, clicking on, or otherwise interacting with the preview 508) to select the scene that the preview corresponds to. This causes the selected scene to be displayed in the playback region 502. In this example, preview 508A is selected (as indicated by the heavier weight outline) and, therefore, display region 502 displays the scene corresponding to preview 508A (indicated here as 508A'). The scene may be displayed as a still frame/image at a particular point in time of the scene, or may be displayed as a video.

In this example, the selected scene 508 is associated with a caption element 510 that has a grey background with black text that reads "Dive into adventure with us . . . ". The selected scene would in all likelihood include additional visual data (e.g. the associated media item) that would also be displayed in 508A' (and/or the scene preview 508A).

UI 500 also includes a number of playback controls: a play control 512 (which can be used to start or pause playback of the production); a playhead 514 (which indicates a current position in both the selected scene and the production as a whole, and which can be dragged forwards or backwards to seek to another time in the production); and a timing indicator 516 (which displays the current playback time and the total time of the production).

UI 500 also includes an add scene control 518 which, if activated, causes application 102 to add a new scene to the production (e.g. at the end).

While not shown, application 102 may display (or otherwise provide access to) additional controls that allow a user to edit the production being viewed. Such controls may, for example, enable a user to perform operations such as: adding new scenes; deleting scenes; reordering scenes; adding an element to a particular scene; removing an element from a particular scene (including removing the caption element that has been automatically generated for the scene); editing an element that has been added to a particular scene (including editing the caption element that has been automatically generated for the scene); adding a new transition between two scenes; deleting an existing transition between two scenes; editing an existing transition between two scenes; and/or other operations.

UI 500 also includes an export control 520 and a share control 522.

On detecting operation of the export control 520, application 102 may provide a user with various options for exporting the production. This may include, for example, one or more options that allow a user to: determine an export location (e.g. on local memory such as 210 or a network accessible storage device); determine an export format (e.g. video format such as Mpeg4, AVI, MOV, WAV, or an alternative video format); determine an export size/resolution; and/or other export options.

On detecting operation of the share control 522, application 102 may provide a user with various options share the production. This may include, for example, one or more options that allow a user to determine a format (as described above) and then share the resulting video (e.g. by attaching it to an electronic communication, uploading to a web server, uploading to a social media service, or sharing in an alternative manner). Application 102 may also provide a user with the option of sending a link (e.g. a URL) to the production (e.g. by generating a link and attaching a link to an electronic communication or allowing a user to copy the link).

At 308 of method 300, application 102 generates a media item description for each media item. An example method 600 for generating a media item description for a media item will be described with reference to FIG. 6. Method 600 is performed for each media item determined at 306.

In this particular example, a machine learning model that is trained to generate textual descriptions of images is used. As one example, the BLIP-2 machine learning model may be used, though alternative machine learning models may be used.

At 602, application 102 determines if the media item is a video-type media item (in which case processing proceeds to 604) or an image-type media item (in which case processing proceeds to 606).

At 604, application 102 processes the video-type media item to determine a representative image thereof. Application 102 may be configured to do this in various ways. In the present embodiments, application 102 is configured to determine the first frame of the media item as the representative image of that media item. In alternative embodiments, application 102 may be configured to process the entire media item in order to determine a representative frame Processing then proceeds to 606.

At 606, application 102 processes the relevant image to generate a textual description thereof. Where the media item is a video-type media item, the relevant image is the representative image determined at 604. Where the media item is an image-type media item, the relevant image is the media item itself.

In the present embodiments, application 102 processes the relevant image using the media description generation module 106. In this embodiment, media description generation module 106 is (or makes use of) a machine learning model that is trained to take an image-type media item as input and generate a textual description of that image. In the present embodiments, a vision-language machine learning model is used. One example of such a machine learning model is the BLIP-2 model, as described in "BLIP-2: Bootstrapping Language-Image Pre-training with Frozen Image Encoders and Large Language Models" by Junnan Li, Dongxu Li, Silvio Savarese, Steven Hoi (arXiv:2301.12597v2 [cs.CV] 1 May 2023). Alternative machine learning models may be used, for example the CoCa model described in "CoCa: Contrastive Captioners are Image-Text Foundation Models" by Jiahui Yu, Zirui Wang, Vijay Vasudevan, Legg Yeung, Mojtaba Seyedhosseini, Yonghui Wu (arXiv:2205.01917v2 [cs.CV] 14 Jun. 2022).

At 608, the media description (e.g. a text string) generated at 606 is returned.

In this example, a machine learning model that is trained to generate textual descriptions of images is used. Accordingly, any video-type media item is initially processed (at 604) to determine a representative image thereof and that representative image is then used to generate a textual description that is intended to be representative of the video-type media item as a whole. In alternative embodiments, however, a machine learning model that is trained to generate textual descriptions of video-type media items may be used (in which case determining a representative frame of the video is not necessary).

At 314 of method 300, application 102 generates a new video production (or data defining a new video production). The precise manner in which a production is generated, and the data that describes that production, will depend on how application 102 (or another application that is to be used to view the production) stores and/or displays productions.

In order to illustrate features of the present disclosure, one example of a production dataset format (and generation of a production using that format) will be described. It will be appreciated that alternative ways of defining a production are possible.

The production dataset of the present example is defined by a set of key-value pairs (e.g. in a dictionary data type) such as:

```
{
  "production": {
    "id": "abc123",
    "name": "My production",
    "scenes": [{scene record 1}, { scene. record 2}, ... { scene
    record n}], "audio": [{audio id 1}, { audio id 2}, ... {
    audio id n}],
  }
}
```

In this example, the production dataset for a given production includes a production identifier (uniquely identifying the production), a name (which application 102 may, for example, automatically generate based on the production description), and scene data (defining the scene(s) of the production). In this example, scene data is stored in an array of scene records. Here, the position of a scene record in the scene array defines its position in the production (e.g. a scene record at index n is before a scene record at index n+1). In alternative embodiments, scene order may be stored as an explicit value in each scene record (or elsewhere). In this example, audio data is stored in an array of audio records, with each element in the array identifying an audio item (e.g. a music track or other item) that has been added to the production.

Various scene record data formats are possible. By way of example, a scene record may have a format such as:

```
{
    "media": "media identifier",
    "dimensions": {"width": <width>, "height": <height>},
    "duration": "<no. seconds>",
    "outro_transition": {<outro transition data>},
    "element data": [{element record 1}, ... {element record n}]
}
```

In this example the media property identifies (and allows retrieval of) the media item that the scene is associated with. The dimensions property defines the dimensions of the scene—e.g. a width and height and the duration property defines a duration of the scene—e.g. in milliseconds. The dimensions and/or duration properties may be automatically set to the dimensions/duration of the media item identified by the media property. The outro transition property provides (or references) data defining an outro transition for the scene. Such a transition may be defined, for example, by a transition style (e.g. fade, slide, or other style), an outro duration (e.g. in seconds), and (if relevant to the style) a direction.

The element data property of the present example provides an array of element records, each defining an element that has been added to the scene. In the present example, the position of an element record in the element data array defines its depth (e.g. z-index) in the scene (e.g. an element record at index n appears behind an element record at index n+1)—with the media item serving as the background to all elements. Different types of element records may be provided for different types of elements that application 102 permits to be added to a scene. An example type of element record (along with example properties) is the caption element described below.

Figures 6, 7:
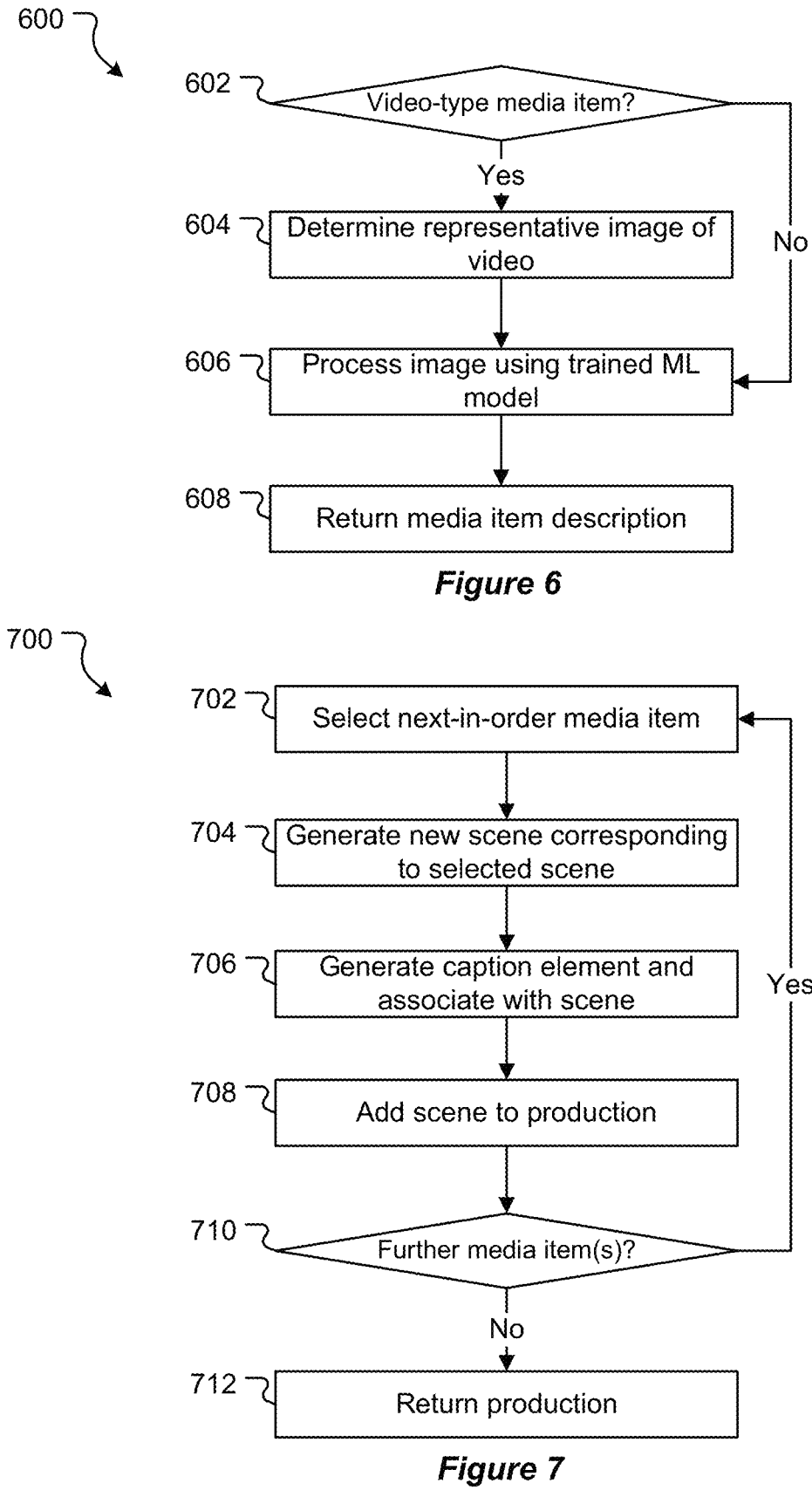
FIG. 6 is a flowchart depicting operations performed to generate a media item description for a media item.
FIG. 7 is a flowchart depicting operations performed to generate a video production from a set of media items and cohesion information.

Turning to FIG. 7, an example method 700 for generating a production will be described. Method 700 is described in the context of a production dataset such as that described above. In the present embodiments, application 102 generates a production using the production generation module 112.

At 702, application 102 selects a next-in-order media item that has not yet been added to the production. Initially, the next-in-order media item will be the first media item. In following processing loops application 102 selects the media items in order.

In the present example, the order of the media items is determined based on the scene order information (which is part of the cohesion information generated at 312).

At 704, application 102 generates a new scene corresponding to the scene selected at 702.

In the context of the scene dataset format described above, this involves generating a new scene record and setting the value of the "media" property to a value that identifies the media item selected at 702 (e.g. a unique identifier, a URL, a file path, or an alternative value). Application 102 may be configured to set the value of the scene record's "dimension" property to be correspond to the dimensions of the selected media item (e.g. by being the same as the media item dimensions/resolution or a corresponding aspect ratio to that defined by the media item). Where the media item is a video-type media item, application 102 may set the value of the scene record's "duration" property to the duration of the media item. Where the media item is an image-type media item, application 102 may set the value of the "duration" property to a default duration (e.g. 2 seconds, 3 seconds, 5 seconds, or an alternative default duration) . . . . Application 102 may be configured to set the value of the scene record's "outro_transition" property to a value indicating no transition (or simply not define this property). Alternatively, application 102 may randomly (or otherwise) select an outro transition from those available and record that value, or set the property to indicate a predefined outro transition value. Initially (i.e. at 704), no element data is defined for the new scene.

In addition, where the media item is an image-type media item, application 102 may be configured to apply one or more animation effects to the media item to make it appear more dynamic. For example, application 102 may select (randomly or otherwise) one or more animations for the media item from a set of animation effects such as: a fly in/out animation; a fade in/out animation; a slow appear/disappear animation; a fast appear/disappear animation; and/or any other type of entry/exit animation At 706, application 102 generates a caption element and associates that caption element with the scene. Generally speaking, the caption element is generated to display the caption (or text based on that caption) that was generated for the selected media item at 312.

The precise format and properties of a caption element may differ depending on implementation. In the present example, application 102 generates an element record that includes properties such as the following:

| Property | Example value(s) |
|---|---|
| Size | Data (e.g. height and width values) defining a size of the caption element. |
| Position | Data (e.g. an (x, y) coordinate pair) defining a spatial position for the caption element. |
| | The position data may define a position that causes the caption element to overlay the media item itself, or may define a position that causes the caption element to be displayed off the media item itself (e.g. in a caption region below/above/to one side of the media item). |
| Background colour | A value (e.g. RGB or other value) indicating a background colour for the caption element. |
| Text | A text string that the caption element is to display. |
| Font | Data defining various font properties for the text. These may include, for example, a font type, font style, font size, font colour and/or any other relevant font properties. |
| Rotation | A value indicating a rotation of the element. |
| Start offset | A value defining when in the scene the caption element should start being displayed commence. This may, for example, be a number of milliseconds from the start of the scene at which display of the caption element should start (a value of 0 indicating the caption element is displayed at the start of the scene). |

-continued

| Property | Example value(s) |
|---|---|
| Duration | A value used to determine when in the scene the caption element should cease being displayed. This may, for example, be a duration (e.g. in milliseconds) - e.g. a duration of x indicating that the caption element is to be displayed for x milliseconds. |
| Entry animation | A value that indicates an entry animation (if any) for the caption element. This may, for example, be a value corresponding to: no entry animation; a fly in animation; a fade in animation; a slow appear animation; a fast appear animation; and/or any other type of entry animation. |
| Exit animation | A value that indicates an exit animation (if any) for the caption element. This may, for example, be a value corresponding to: no exit animation; a fly out animation; a fade out animation; a slow disappear animation; a fast disappear animation; and/or any other type of exit animation. |

Additional and/or alternative properties for a caption element are possible.

While the text property of a caption element such as this will be determined based on the caption that has been generated for the media item at 312, application 102 may be configured to determine other properties of the caption element in various ways.

In the present embodiment, application 102 is configured with one or more template caption elements, each including a set of predefined caption element properties.

By way of example, application 102 may be configured with an opening scene caption element template (which is used for the opening/first-in-order scene of a production), a closing scene caption element template (which is used for the closing/last-in-order scene of a production), and an interim scene caption element template (which is used for any scene that is neither the opening nor closing scene of a production).

As an alternative example, application 102 may be configured with an alternative set of caption element templates. In this case, when generating the caption element for a particular scene, application 102 may be configured to randomly (or otherwise) select one of the caption element templates to use.

As a further alternative example, application 102 may be configured with a single caption element template which is used for all caption elements.

As yet a further example, application 102 may be configured to determine one or more caption element properties based on the media item that the caption element is to overlay and/or the caption that the caption element is to display. As one example, application 102 may be configured to analyse the media item in order to determine an appropriate (contrasting) background colour (e.g. if the media item is predominantly dark colours application 102 may determine a light background colour, and if the media is predominantly light colours application 102 may determine a dark background colour). Application 102 may then determine a font colour that contrasts with the selected background colour.

By way of still further alternative, application 102 may be configured to dynamically determine one or more caption element properties at the time the caption element is generated. For example, application 102 may determine caption element properties as follows:

| Property | Example value(s) |
|---|---|
| Size | Application 102 may be automatically determine the size based on the actual text that is to be displayed and the font properties. For example, application 102 may set size values that define the smallest bounding box that fits around the text with appropriate padding. |
| Position | Application 102 may randomly select position data (with the limitation that the position must allow the element to be displayed on-screen). Alternatively, application 102 may be configured to randomly (or otherwise) select from a set of defined positions - e.g. "top centred" (e.g. a position that is horizontally centred and offset from the top by, e.g., 5% of the scene height), "middle-centred" (e.g. a position that is horizontally and vertically centred, "bottom-centred" (e.g. a position that is horizontally centred and offset from the bottom by, e.g., 5% of the scene height), and/or other defined positions. |
| Background colour (and font colour) | Application 102 may be configured to always use a predefined background colour (e.g. white, and at the same time be configured to always use a corresponding contrasting font colour - e.g. black). Alternatively, Application 102 may be configured to randomly (or otherwise) select from a set of predefined background colours (each background colour in the set having a corresponding contrasting font colour). |
| Text | The caption (or text based thereon) generated for the media item. |
| Font | Application 102 may be configured with defined font properties. Application 102 may automatically adjust the font size based on the number of characters that are to be displayed (e.g. using larger font sizes for smaller numbers of characters and vice versa). |
| Rotation | Application 102 may be configured to always use a default rotation (e.g. 0 degrees). Alternatively, Application 102 may be configured to randomly (or otherwise) select a rotation from within a predefined range (e.g. between 0 and 45 degrees inclusive, or an alternative range). |

-continued

| Property | Example value(s) |
|---|---|
| Start offset/duration | Application 102 may be configured to always display the element for the entirety of the scene and set start offset and duration values accordingly. Alternatively, application 102 may be configured to calculate start offset and duration values that cause the element to display for a defined portion of the scene - e.g. the middle 90% of the scene or suchlike. |
| Entry animation | Application 102 may be configured to always set a predefined entry animation (e.g. no animation or an alternative entry animation). Alternatively, application 102 may be configured to randomly (or otherwise) select an entry animation from those available. |
| Exit animation | Application 102 may be configured to always set a predefined exit animation (e.g. no animation or an alternative entry animation). Alternatively, application 102 may be configured to select an exit animation based on the entry animation. E.g. application 102 may be configured to select an exit animation that corresponds to the entry animation (e.g. if the entry animation is fade in, then a fade our exit animation may be selected). Alternatively, application 102 may be configured to randomly (or otherwise) select an exit animation from those available. |

Once the caption element has been generated, application 102 associates it with the scene generated at 704. In the context of the production data described above, application 102 does this by adding the element record to the scene's element data (e.g. appending it to the element data array).

At 708, application 102 adds the scene to the production. In the context of the production data described above, application 102 does this by adding the scene record to the production's scenes data (e.g. appending it to the scenes array).

At 710, application 102 determines whether any media items have not yet been processed and added to the production. If one or more media items have not been processed, processing returns to 702. Otherwise, processing proceeds to 712.

At 712, generation of the production is complete and application 102 returns the production (or the production dataset or a link/reference to the production dataset).

In the present context, where array index determines order, selecting media items in order at 702 and appending each scene record that is generated to the scene array (i.e. adding each scene record to the end of the scene array) results the scenes being ordered according to the scene order determined at 312. In alternative embodiments, however, application 102 could select media items at 702 in any order and handle reordering of the scenes prior to finalising the production dataset.

Application 102 may be configured to perform additional operations when generating a production. As one example, application 102 may determine a music track and add this to the production. In this case, application 102 may determine a music track in any appropriate way, e.g.: applying a predetermined music track; randomly (or otherwise) selecting a music track from a predefined set of music tracks; selecting a music track based on the production length; selecting a music track based on one or more of the production description, the media item description(s), the caption(s); and/or selecting a music track in an alternative way.

EXAMPLE

To illustrate the operation of method 300, consider a scenario in which:
    a production description (determined at 304) of "a promotional video for my dive school in Cairns";

a first media item (determined at 306) that is a video showing a group of people dressed in SCUBA gear on a boat;
a second media item (determined at 306) that is a video showing a boat in the ocean;
a third media item (determined at 306) that is a video of a person in scuba gear underwater with a school of fish;
a first media item description (generated at 308 and corresponding to the first media item) that is "a group of scubas are ready to go into the water";
a second media item description (generated at 308 and corresponding to the second media item) that is "a boat floating in the ocean";
a third media item description (generated at 308 and corresponding to the third media item) that is "a man scuba diving with fish".

At 310, application 102 generates a prompt such as:
"I will provide descriptions of 3 media files that you will use to create a video about a promotional video for my dive school in Cairns. The media file descriptions are: "a group of scubas are ready to go into the water"; "a boat floating in the ocean"; "a man scuba diving with fish". Determine an order for the media files and suggest a caption for each file to tell a story. Generate a set of key/value pairs that is ordered based on the order and in which each key/value pair has the format {"media file description": "text overlay"}.

At 312, this prompt is then used as input to a LLM, which may generate an output (e.g. cohesion information) such as:

```
{
    "a boat floating in the ocean" : "Dive into adventure with us",
    "a group of scubas are ready to go into the water" : "Join our Dive School for an unforgettable experience",
    "a man scuba diving with fish" : "Discover hidden treasures with us"
}
```

At 314, production data such as the following is then generated:
    A first-in-order scene record (e.g. the first scene record in the scenes array) that is associated with the second media item and includes a caption element for displaying the "text overlay" (e.g. the caption "Dive into adventure with us . . . ") generated for the second media item. An example of this is element 510 of FIG. 5.
    A second-in-order scene (e.g. the second scene record in the scenes array) that is associated with the first media item and includes a caption element for displaying the "text overlay" (e.g. caption "Join our Dive School for an unforgettable experience") generated for the first media item.

A third-in-order scene (e.g. the third scene record in the scenes array) that is associated with the third media item and includes a caption element for displaying the "text overlay" (e.g. caption "Discover hidden treasures with us") generated for the third media item.

At 316, application 102 then displays or otherwise outputs the production generated at 314.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

In the embodiments described above, processing is performed by a single application 102 running on a single computer processing system 100. Alternatives are, however, possible.

For example, one or more of modules 104, 106, 110, and/or 112 may be distinct applications (running on the same or separate computer processing systems) that interoperate with application 102 to perform the described techniques.

As another example, the functions performed by modules 104, 106, 110, and/or 112 may be combined together in a production generation package that can be used to extend the functionality provided by any appropriate video production (or design) application. In this case the production generation package may be locally installed on a given end user system, e.g. as a plug-in or extension to an existing video production application.

As yet another example, the functions performed by modules 104, 106, 110, and/or 112 may be combined together in a production generation service that can be accessed by any appropriate application (e.g. a web browser or other application). For example, the functionality of modules 106, 110, and/or 112 may be provided by one or more server-side applications. In this case, application 102 may be configured to provide a front end (e.g. user interfaces such as those described above. In order to perform the production generation operations, however, application 102 will communicate the production description and media items (or identifiers thereof) to the server environment. The server environment then performs the relevant operations (e.g. those of modules 106, 110, and 112) before returning the production (or relevant production data) to application 102.

Unless otherwise stated, the terms "include" and "comprise" (and variations thereof such as "including", "includes", "comprising", "comprises", "comprised" and the like) are used inclusively and do not exclude further features, components, integers, steps, or elements.

In certain instances the present disclosure may use the terms "first," "second," etc. to describe various elements. Unless stated otherwise, these terms are used only to distinguish elements from one another and not in an ordinal sense. For example, a first element or feature could be termed a second element or feature or vice versa without departing from the scope of the described examples. Furthermore, when the terms "first", "second", etc. are used to differentiate elements or features rather than indicate order, a second element or feature could exist without a first element or feature. For example, a second element or feature could occur before a first element or feature (or without a first element or feature ever occurring).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for automatically generating a video production, the method comprising:

determining a production description, the production description including text that generally describes the video production that is to be generated;

determining a set of media items, the set of media items including one or more media items that are to be included in the video production that is to be generated;

generating, by a computer processing unit, a set of media item descriptions, the set of media item descriptions including a media item description corresponding to each media item;

generating a prompt based on the production description, the set of media item descriptions and an ordering component, wherein the prompt is a text string and includes order determination text;

generating, using the prompt, cohesion information, the cohesion information including a set of captions and scene order information, the set of captions including a caption corresponding to each media item; and automatically generating the video production based on the set of media items and the cohesion information, wherein:

the video production is generated to include a set of one or more scenes ordered based on the scene order information;

each scene corresponds to a particular media item; and each scene is generated so the caption corresponding to the particular media item that the scene corresponds to is displayed during playback of the scene.

2. The computer implemented method of claim 1, wherein the set of media items includes one or more video-type media items.

3. The computer implemented method of claim 1, wherein the set of media items includes one or more image-type media items.

4. The computer implemented method of claim 1, wherein the set of media item descriptions is generated using a first machine learning model.

5. The computer implemented method of claim 4, wherein:

the set of media items includes a first media item that is a video-type media item; and generating the set of media item descriptions includes generating a first media item description corresponding to the first media item by:

determining a representative image of the first media item; and processing the representative image of the first media item using the first machine learning model.

6. The computer implemented method of claim 4, wherein the set of media items includes a second media item that is an image-type media item; and generating the set of media item descriptions includes generating a second media item description corresponding to the second media item by processing the second media item using the first machine learning model.

7. The computer implemented method of claim 1, wherein:

the prompt is generated based on prompt generation data that defines one or more set text components and one or more placeholder components; and the prompt is generated to include:

the one or more set text components; and replacement text in place of each placeholder component.

8. The computer implemented method of claim 7, wherein:

the prompt generation data includes a first placeholder component; and generating the prompt includes generating first replacement text to be used in place of the first placeholder component, the first replacement text being based on the set of media item descriptions.

9. The computer implemented method of claim 7, wherein:

the prompt generation data includes a second placeholder component; and generating the prompt includes generating second replacement text to be used in place of the second placeholder component, the second replacement text being based on the production description.

10. The computer implemented method of claim 7, wherein:

the prompt generation data includes a third placeholder component; and generating the prompt includes generating third replacement text in place of the third placeholder component, the third replacement text being based on a number of media items in the set of media items.

11. The computer implemented method of claim 7, wherein the one or more set text components include one or more of: an output format text component; a tone component; and a form component.

12. The computer implemented method of claim 1, wherein the cohesion information is generated by using the prompt as input to a second machine learning model.

13. The computer implemented method of claim 12, wherein the second machine learning model is a large language model.

14. The computer implemented method of claim 1, wherein:

the set of media items includes a third media item and the cohesion information includes a third caption corresponding to the third media item; and automatically generating the video production includes:

generating a first scene based on a third media item;

generating a first element that includes text based on the third caption; and associating the first element with the first scene.

15. A computer processing system comprising:

one or more computer processing units; and non-transitory computer-readable medium storing instructions which, when executed by the one or more computer processing units, cause the one or more computer processing units to perform a method comprising:

determining a production description, the production description including text that generally describes the video production that is to be generated;

determining a set of media items, the set of media items including one or more media items that are to be included in the video production that is to be generated;

generating, by a computer processing unit, a set of media item descriptions, the set of media item descriptions including a media item description corresponding to each media item;

generating a prompt based on the production description, the set of media item descriptions and an ordering component, wherein the prompt is a text string and includes order determination text;

generating, using the prompt, cohesion information, the cohesion information including a set of captions and scene order information, the set of captions including a caption corresponding to each media item; and automatically generating the video production based on the set of media items and the cohesion information, wherein:

the video production is generated to include a set of one or more scenes ordered based on the scene order information;

each scene corresponds to a particular media item; and each scene is generated so the caption corresponding to the particular media item that the scene corresponds to is displayed during playback of the scene.

16. The computer processing system of claim 15, wherein:

the set of media items includes a first media item that is a video-type media item; and generating the set of media item descriptions includes generating a first media item description corresponding to the first media item by:

determining a representative image of the first media item; and processing the representative image of the first media item using a first machine learning model.

17. Non-transitory storage storing instructions executable by one or more computer processing units to cause the one or more computer processing units to perform a method comprising:

determining a production description, the production description including text that generally describes the video production that is to be generated;

determining a set of media items, the set of media items including one or more media items that are to be included in the video production that is to be generated;

generating, by a computer processing unit, a set of media item descriptions, the set of media item descriptions including a media item description corresponding to each media item;

generating a prompt based on the production description, the set of media item descriptions and an ordering component, wherein the prompt is a text string and includes order determination text;

generating, using the prompt, cohesion information, the cohesion information including a set of captions and scene order information, the set of captions including a caption corresponding to each media item; and automatically generating the video production based on the set of media items and the cohesion information, wherein:

the video production is generated to include a set of one or more scenes ordered based on the scene order information;

each scene corresponds to a particular media item; and each scene is generated so the caption corresponding to the particular media item that the scene corresponds to is displayed during playback of the scene.

\*    \*    \*    \*    \*